US007187928B1

(12) United States Patent
Senn et al.

(10) Patent No.: US 7,187,928 B1
(45) Date of Patent: Mar. 6, 2007

(54) CALL DELIVERY SYSTEMS FOR ROAMING PREPAID SUBSCRIBERS

(75) Inventors: Paul Senn, Woburn, MA (US); Thomas Erskine, Woburn, MA (US); John R. Cooper, Woburn, MA (US)

(73) Assignee: Boston Communications Group, Inc., Woburn, MA (US)

( * ) Notice: Subject to any disclaimer, the term of this patent is extended or adjusted under 35 U.S.C. 154(b) by 0 days.

(21) Appl. No.: 09/449,001

(22) Filed: Nov. 24, 1999

Related U.S. Application Data

(60) Provisional application No. 60/109,893, filed on Nov. 25, 1998, provisional application No. 60/109,633, filed on Nov. 24, 1998.

(51) Int. Cl.
*H04Q 7/20* (2006.01)

(52) U.S. Cl. ............... 455/432.1; 455/406; 455/432.3; 455/433; 455/435.1

(58) Field of Classification Search ........ 455/405–411, 455/433, 435, 436–440, 461, 445, 432, 456, 455/466, 567, 414.1, 414.2, 404.2, 417, 421, 455/422.1, 432.1, 432.2, 432.3, 435.1, 435.2, 455/456.1, 456.3, 456.5, 456.6; 379/112.01, 379/115, 207, 88.02, 144.01, 111, 114.15–114.2, 379/88.01
See application file for complete search history.

(56) References Cited

U.S. PATENT DOCUMENTS

| 3,453,389 A | 7/1969 | Shaer ......................... 179/7.1 |
| 3,652,795 A | 3/1972 | Wolf et al. .................... 179/2 |
| 3,654,396 A | 4/1972 | Biezeveld .................... 179/18 |
| 3,676,597 A | 7/1972 | Peterson .................... 179/6.3 |
| 3,692,946 A | 9/1972 | Budrys et al. ............... 179/18 |
| 3,693,156 A | 9/1972 | DiLello ...................... 340/149 |

(Continued)

FOREIGN PATENT DOCUMENTS

DE 29 47 164 11/1980

(Continued)

OTHER PUBLICATIONS

Ahimovic, Susan M. and Joan M. Michaels.; "Services for Tomorrow's PCS", IEEE Aug. 1993, pp. 222-227.

(Continued)

*Primary Examiner*—Pablo N. Tran
(74) *Attorney, Agent, or Firm*—Weingarten, Schurgin, Gagnebin & Lebovici LLP

(57) ABSTRACT

The invention provides systems and methods that operate to provide seamless roaming to a prepaid subscriber in as many markets as possible. To that end, the systems of the invention include a location register (LR) that can determine the type, or class, of serving market with which the roaming subscriber is registering. Once the class of the serving market is identified, the LR can modify a subscriber's profile as a function of this class, and return to the serving market a profile that will allow the serving market to employ the prepaid platform that services the subscriber and thereby provide services to the roaming subscriber. In optional embodiments, the LR may also respond to location requests from the prepaid platform. The location information may be employed by the subscriber to determine a rate structure for a call, and thereby decrement the subscriber's balance as a function of, at least in part, the location of the roaming subscriber.

52 Claims, 7 Drawing Sheets

U.S. PATENT DOCUMENTS

| | | | |
|---|---|---|---|
| 3,697,693 A | 10/1972 | Deschenes et al. | 179/2 |
| 3,718,764 A | 2/1973 | Deschenes et al. | 179/2 |
| 3,731,000 A | 5/1973 | Joel, Jr. | 179/8 |
| 3,818,455 A | 6/1974 | Brenski et al. | 340/172.5 |
| 3,838,225 A | 9/1974 | Limberg et al. | 179/27 |
| 3,852,571 A | 12/1974 | Hall et al. | 235/61.7 |
| 3,892,948 A | 7/1975 | Constable | 340/149 |
| 3,920,908 A | 11/1975 | Kraus | 179/2 |
| 3,938,091 A | 2/1976 | Atalla et al. | 340/149 |
| 4,007,339 A | 2/1977 | Joel, Jr. | 179/27 |
| 4,086,439 A | 4/1978 | Vowles et al. | 179/27 |
| 4,162,377 A | 7/1979 | Mearns | 179/18 |
| 4,191,860 A | 3/1980 | Weber | 179/18 |
| 4,224,472 A | 9/1980 | Zarount | 179/27.1 |
| 4,243,841 A | 1/1981 | Young | 179/6.3 |
| 4,264,956 A | 4/1981 | Delaney | 364/467 |
| 4,277,649 A | 7/1981 | Sheinbein | 179/18 |
| 4,300,041 A | 11/1981 | Nama | 235/449 |
| 4,310,726 A | 1/1982 | Asmuth | 179/18 |
| 4,332,985 A | 6/1982 | Samuel | 179/90 |
| 4,351,028 A | 9/1982 | Peddie et al. | 364/483 |
| 4,399,330 A | 8/1983 | Kuenzel | 179/2 |
| 4,400,587 A | 8/1983 | Taylor et al. | 179/27 |
| 4,410,765 A | 10/1983 | Hestad et al. | 179/7.1 |
| 4,439,636 A | 3/1984 | Newkirk et al. | 179/7.1 |
| 4,506,116 A | 3/1985 | Genest | 179/90 |
| 4,517,412 A | 5/1985 | Newkirk et al. | 179/7.1 |
| 4,518,824 A | 5/1985 | Mondardini | 179/6.3 |
| 4,587,379 A | 5/1986 | Masuda | 179/7.1 |
| 4,594,663 A | 6/1986 | Nagata et al. | 364/401 |
| 4,595,983 A | 6/1986 | Gehalo et al. | 364/401 |
| 4,611,096 A | 9/1986 | Asmuth et al. | 179/18 |
| 4,680,785 A | 7/1987 | Akiyama et al. | 379/57 |
| 4,698,752 A | 10/1987 | Goldstein et al. | 364/200 |
| 4,755,872 A | 7/1988 | Bestler et al. | 358/86 |
| 4,756,020 A | 7/1988 | Fodale | 379/112 |
| 4,776,000 A | 10/1988 | Parienti | 379/42 |
| 4,776,003 A | 10/1988 | Harris | 379/91 |
| 4,776,033 A | 10/1988 | Scheinert | 455/31 |
| 4,777,646 A | 10/1988 | Harris | 379/91 |
| 4,777,647 A | 10/1988 | Smith et al. | 379/151 |
| 4,791,640 A | 12/1988 | Sand | 370/58 |
| 4,813,065 A | 3/1989 | Segala | 379/112 |
| 4,831,647 A | 5/1989 | D'Avello et al. | 379/91 |
| 4,845,740 A | 7/1989 | Tokuyama et al. | 379/91 |
| 4,852,149 A | 7/1989 | Zwick et al. | 379/67 |
| 4,852,155 A | 7/1989 | Barraud | 379/145 |
| 4,860,336 A | 8/1989 | D'Avello et al. | 379/63 |
| 4,860,341 A | 8/1989 | D'Avello et al. | 379/91 |
| 4,879,744 A | 11/1989 | Tasaki et al. | 379/144 |
| 4,893,330 A | 1/1990 | Franco | 379/91 |
| 4,897,870 A | 1/1990 | Golden | 379/144 |
| 4,899,373 A | 2/1990 | Lee et al. | 379/207 |
| 4,901,340 A | 2/1990 | Parker et al. | 379/60 |
| 4,930,150 A | 5/1990 | Katz | 379/93 |
| 4,930,154 A | 5/1990 | Bauer et al. | 379/246 |
| 4,935,956 A | 6/1990 | Hellwarth et al. | 379/112 |
| 4,942,598 A | 7/1990 | Davis | 379/57 |
| 4,951,308 A | 8/1990 | Bishop et al. | 379/91 |
| 4,955,049 A | 9/1990 | Ghisler | 379/58 |
| 4,958,368 A | 9/1990 | Parker | 379/91 |
| 4,965,821 A | 10/1990 | Bishop et al. | 379/91 |
| 4,979,207 A | 12/1990 | Baum et al. | 379/112 |
| 4,984,290 A | 1/1991 | Levine et al. | 455/33 |
| 4,996,705 A | 2/1991 | Entenmann et al. | 379/91 |
| 5,003,585 A | 3/1991 | Richer | 379/144 |
| 5,003,595 A | 3/1991 | Collins et al. | 380/25 |
| 5,007,077 A | 4/1991 | Fields et al. | 379/67 |
| 5,008,929 A | 4/1991 | Olsen et al. | 379/112 |
| 5,014,301 A | 5/1991 | Maltezos | 379/155 |
| 5,040,177 A | 8/1991 | Martin et al. | 370/110.1 |
| 5,046,088 A | 9/1991 | Margulies | 379/211 |
| 5,063,588 A | 11/1991 | Patsiokas et al. | 340/57 |
| 5,068,891 A | 11/1991 | Marshall | 379/91 |
| 5,103,449 A | 4/1992 | Jolissaint | 370/110.1 |
| 5,127,040 A | 6/1992 | D'Avello et al. | 379/58 |
| 5,128,938 A | 7/1992 | Borras | 370/95.1 |
| 5,134,646 A | 7/1992 | Carlson | 379/67 |
| 5,138,648 A | 8/1992 | Palomeque et al. | 379/22 |
| 5,144,649 A | 9/1992 | Zicker et al. | 379/59 |
| 5,159,625 A | 10/1992 | Zicker | 379/59 |
| 5,161,181 A | 11/1992 | Zwick | 379/67 |
| 5,164,923 A | 11/1992 | Avis | 368/4 |
| 5,185,781 A | 2/1993 | Dowden et al. | 379/67 |
| 5,185,782 A | 2/1993 | Srinivasan | 379/67 |
| 5,192,947 A | 3/1993 | Neustein | 340/825.44 |
| 5,216,703 A | 6/1993 | Roy | 379/59 |
| 5,220,593 A | 6/1993 | Zicker et al. | 379/59 |
| 5,222,120 A | 6/1993 | McLeod et al. | 379/88 |
| 5,222,125 A | 6/1993 | Creswell et al. | 379/67 |
| 5,233,642 A | 8/1993 | Renton | 379/59 |
| 5,243,643 A | 9/1993 | Sattar et al. | 379/88 |
| 5,268,958 A | 12/1993 | Nakano | 379/211 |
| 5,272,747 A | 12/1993 | Meads | 379/59 |
| 5,274,802 A | 12/1993 | Altine | 395/600 |
| 5,276,444 A | 1/1994 | McNair | 340/925.33 |
| 5,276,731 A | 1/1994 | Arbel et al. | 379/88 |
| 5,282,243 A | 1/1994 | Dabbaghi et al. | 379/201 |
| 5,289,528 A | 2/1994 | Ueno et al. | 379/67.1 |
| 5,301,223 A | 4/1994 | Amadon et al. | 379/88 |
| 5,301,234 A | 4/1994 | Mazziotto et al. | 380/23 |
| 5,301,246 A | 4/1994 | Archibald et al. | 380/23 |
| 5,303,285 A | 4/1994 | Kerihuel et al. | 379/58 |
| 5,309,501 A | 5/1994 | Kozik et al. | 379/58 |
| 5,311,569 A | 5/1994 | Brozovich et al. | 379/45 |
| 5,311,572 A | 5/1994 | Friedes et al. | 379/67 |
| 5,319,699 A | 6/1994 | Kerihuel et al. | 379/58 |
| 5,321,735 A | 6/1994 | Breeden et al. | 379/58 |
| 5,325,418 A | 6/1994 | McGregor et al. | 379/59 |
| 5,327,144 A | 7/1994 | Stilp et al. | 342/387 |
| 5,327,482 A | 7/1994 | Yamamoto | 379/61 |
| 5,327,485 A | 7/1994 | Leaden | 379/95 |
| 5,329,578 A | 7/1994 | Brennan et al. | 379/67 |
| 5,339,352 A | 8/1994 | Armstrong et al. | 379/58 |
| 5,341,414 A | 8/1994 | Popke | 379/142 |
| 5,345,498 A | 9/1994 | Mauger | 379/58 |
| 5,345,595 A | 9/1994 | Johnson et al. | 455/33.1 |
| 5,352,876 A | 10/1994 | Watanabe et al. | 235/381 |
| 5,359,182 A | 10/1994 | Schilling | 235/380 |
| 5,359,643 A | 10/1994 | Gammino | 379/143 |
| 5,365,575 A | 11/1994 | Katz | 379/92 |
| 5,369,699 A | 11/1994 | Page et al. | 379/38 |
| 5,371,493 A | 12/1994 | Sharpe et al. | 340/825.34 |
| 5,377,267 A | 12/1994 | Suzuki et al. | 380/23 |
| 5,381,467 A | 1/1995 | Rosinski et al. | 379/121 |
| 5,384,825 A | 1/1995 | Dillard et al. | 379/59 |
| 5,384,831 A | 1/1995 | Creswell et al. | 379/67 |
| 5,396,545 A | 3/1995 | Nair et al. | 379/91 |
| 5,396,558 A | 3/1995 | Ishiguro et al. | 380/25 |
| 5,404,580 A | 4/1995 | Simpson et al. | 455/89 |
| 5,408,513 A | 4/1995 | Busch, Jr. et al. | 379/59 |
| 5,408,519 A | 4/1995 | Pierce et al. | 379/67 |
| 5,409,092 A | 4/1995 | Itako et al. | 194/210 |
| 5,418,844 A | 5/1995 | Morrisey et al. | 379/207 |
| 5,423,068 A | 6/1995 | Hecker | 455/56.1 |
| 5,426,634 A | 6/1995 | Cote et al. | 370/58.2 |
| 5,428,677 A | 6/1995 | Hakamada | 379/144 |
| 5,438,615 A | 8/1995 | Moen | 379/144 |
| 5,448,627 A | 9/1995 | Ueno et al. | 379/67 |
| 5,450,479 A | 9/1995 | Alesio et al. | 379/144 |
| 5,465,289 A | 11/1995 | Kennedy, Jr. | 379/59 |
| 5,465,293 A | 11/1995 | Chiller et al. | 379/89 |
| 5,467,388 A | 11/1995 | Redd, Jr. et al. | 379/189 |
| 5,469,496 A | 11/1995 | Emery et al. | 379/58 |

| Patent No. | Date | Inventor | Class |
|---|---|---|---|
| 5,473,681 A | 12/1995 | Partridge, III | 379/229 |
| 5,477,038 A | 12/1995 | Levine et al. | 235/380 |
| 5,485,505 A | 1/1996 | Norman et al. | 379/58 |
| 5,495,521 A | 2/1996 | Rangachar | 379/95 |
| 5,502,761 A | 3/1996 | Duncan et al. | 379/142 |
| 5,504,808 A | 4/1996 | Hamrick, Jr. | 379/144 |
| 5,509,056 A | 4/1996 | Ericsson et al. | 379/144 |
| 5,511,114 A | 4/1996 | Stimson et al. | 379/114 |
| 5,517,559 A | 5/1996 | Hayashi et al. | 379/112 |
| 5,524,146 A | 6/1996 | Morrisey et al. | 379/207 |
| 5,526,401 A | 6/1996 | Roach, Jr. et al. | 379/59 |
| 5,526,413 A | 6/1996 | Cheston, III et al. | 379/201 |
| 5,544,227 A | 8/1996 | Blust et al. | 379/63 |
| 5,544,229 A | 8/1996 | Creswell et al. | 379/67 |
| 5,546,444 A | 8/1996 | Roach, Jr. et al. | 379/59 |
| 5,546,446 A | 8/1996 | Tsunokawa et al. | 379/114 |
| 5,550,897 A | 8/1996 | Seiderman | 379/59 |
| 5,550,899 A | 8/1996 | McLeod et al. | 379/67 |
| 5,553,120 A | 9/1996 | Katz | 379/88 |
| 5,555,290 A | 9/1996 | McLeod et al. | 379/67 |
| 5,559,871 A | 9/1996 | Smith | 379/115 |
| 5,561,706 A | 10/1996 | Fenner | 379/60 |
| 5,561,707 A | 10/1996 | Katz | 379/88 |
| 5,561,854 A | 10/1996 | Antic et al. | 455/56.1 |
| 5,572,583 A | 11/1996 | Wheeler, Jr. et al. | 379/207 |
| 5,577,101 A | 11/1996 | Böhm | 379/58 |
| 5,577,109 A | 11/1996 | Stimson et al. | 379/112 |
| 5,577,110 A | 11/1996 | Aquino | 379/201 |
| 5,579,375 A | 11/1996 | Ginter | 379/59 |
| 5,579,376 A | 11/1996 | Kennedy, III et al. | 379/60 |
| 5,579,379 A | 11/1996 | D'Amico et al. | 379/112 |
| 5,583,918 A | 12/1996 | Nakagawa | 379/61 |
| 5,583,920 A | 12/1996 | Wheeler, Jr. | 379/88 |
| 5,592,535 A | 1/1997 | Klotz | 379/58 |
| 5,592,537 A | 1/1997 | Moen | 379/67 |
| 5,602,906 A | 2/1997 | Phelps | 379/114 |
| 5,606,602 A | 2/1997 | Johnson et al. | 379/115 |
| 5,608,778 A | 3/1997 | Partridge, III | 379/58 |
| 5,610,972 A | 3/1997 | Emery et al. | 379/58 |
| 5,610,973 A | 3/1997 | Comer | 379/59 |
| 5,625,669 A | 4/1997 | McGregor et al. | 379/58 |
| 5,631,947 A | 5/1997 | Wittstein et al. | 379/59 |
| 5,646,839 A | 7/1997 | Katz | 379/93.01 |
| 5,657,377 A | 8/1997 | Pinard et al. | 379/93.02 |
| 5,673,299 A | 9/1997 | Fuller et al. | 379/57 |
| 5,673,306 A | 9/1997 | Amadon et al. | 379/59 |
| 5,675,607 A | 10/1997 | Alesio et al. | 379/114 |
| 5,677,945 A | 10/1997 | Mullins et al. | 379/91 |
| 5,684,863 A | 11/1997 | Katz | 379/88 |
| 5,689,552 A | 11/1997 | Gibilisco | 379/145 |
| 5,692,037 A | 11/1997 | Friend | 379/112 |
| 5,694,455 A | 12/1997 | Goodman | 379/59 |
| 5,708,702 A | 1/1998 | DePaul et al. | 379/230 |
| 5,719,926 A | 2/1998 | Hill | 379/113 |
| 5,721,768 A | 2/1998 | Stimson et al. | 379/114 |
| 5,727,057 A | 3/1998 | Emery et al. | 379/211 |
| 5,732,131 A | 3/1998 | Nimmagadda et al. | 379/211 |
| 5,732,346 A | 3/1998 | Lazaridis et al. | 455/406 |
| 5,737,701 A | 4/1998 | Rosenthal et al. | 455/411 |
| 5,748,720 A | 5/1998 | Loder | 379/144 |
| 5,752,186 A | 5/1998 | Malackowski et al. | 455/414 |
| 5,758,281 A | 5/1998 | Emery et al. | 455/428 |
| 5,778,313 A | 7/1998 | Fougnies | 455/406 |
| 5,781,855 A | 7/1998 | Reuhkala et al. | 455/403 |
| 5,787,156 A | 7/1998 | Katz | 379/93.12 |
| 5,793,846 A | 8/1998 | Katz | 379/88 |
| 5,794,144 A | 8/1998 | Comer et al. | 455/426 |
| 5,797,097 A | 8/1998 | Roach, Jr. et al. | 455/456 |
| 5,814,798 A | 9/1998 | Zancho | 235/380 |
| 5,815,551 A | 9/1998 | Katz | 379/88 |
| 5,815,561 A | 9/1998 | Nguyen et al. | 379/115 |
| 5,819,176 A | 10/1998 | Rast | 455/422 |
| 5,828,734 A | 10/1998 | Katz | 379/93.13 |
| 5,845,211 A | 12/1998 | Roach, Jr. | 455/436 |
| 5,850,518 A | 12/1998 | Northrup | 399/200.33 |
| 5,850,599 A | 12/1998 | Seiderman | 455/406 |
| 5,864,604 A | 1/1999 | Moen et al. | 379/88 |
| 5,873,043 A | 2/1999 | Comer | 455/458 |
| 5,898,762 A | 4/1999 | Katz | 379/93.12 |
| 5,909,485 A | 6/1999 | Martin et al. | 379/144 |
| 5,917,893 A | 6/1999 | Katz | 379/93.02 |
| 5,940,755 A | 8/1999 | Scott | 455/426 |
| 5,946,380 A | 8/1999 | Cohen et al. | 379/127 |
| 5,960,416 A | 9/1999 | Block | 705/34 |
| 5,987,118 A | 11/1999 | Dickerman et al. | 379/265 |
| 5,991,413 A | 11/1999 | Arditti et al. | 380/25 |
| 6,003,770 A | 12/1999 | Schilling | 235/382.5 |
| 6,016,344 A | 1/2000 | Katz | 379/260 |
| 6,029,062 A * | 2/2000 | Hanson | 379/114.17 |
| 6,035,021 A | 3/2000 | Katz | 379/93.12 |
| 6,044,135 A | 3/2000 | Katz | 379/93.13 |
| 6,044,265 A | 3/2000 | Roach, Jr. | 455/419 |
| 6,047,179 A * | 4/2000 | Kirby | 455/406 |
| 6,064,875 A * | 5/2000 | Morgan | 455/407 |
| 6,075,982 A | 6/2000 | Donovan et al. | 455/406 |
| 6,101,378 A | 8/2000 | Barabash et al. | 455/406 |
| 6,108,537 A | 8/2000 | Comer et al. | 455/426 |
| 6,125,275 A | 9/2000 | Comer et al. | 455/426 |
| 6,154,648 A | 11/2000 | Comer | 455/426 |
| 6,208,851 B1* | 3/2001 | Hanson | 455/405 |
| 6,226,364 B1* | 5/2001 | O'Neil | 379/112.01 |
| 6,308,067 B1* | 10/2001 | Morgan | 379/88.02 |
| 6,314,171 B1* | 11/2001 | Dowens | 379/111 |
| 6,324,394 B1* | 11/2001 | Vazvan | 455/406 |
| 6,330,443 B1* | 12/2001 | Kirby | 455/406 |
| 2001/0009849 A1* | 7/2001 | Hanson | 455/408 |
| 2001/0041567 A1* | 11/2001 | Morgan | 455/433 |
| 2001/0044293 A1* | 11/2001 | Morgan | 455/405 |
| 2002/0004380 A1* | 1/2002 | Pedersen et al. | 455/406 |

FOREIGN PATENT DOCUMENTS

| | | |
|---|---|---|
| DE | 34 01 319 | 7/1985 |
| DE | 4312362 | 10/1994 |
| DE | 44 08 655 | 9/1995 |
| EP | 0 048 868 | 4/1982 |
| EP | 0 088 639 | 9/1983 |
| EP | 0 115 240 | 8/1984 |
| EP | 0 128 555 | 12/1984 |
| EP | 0 185 365 | 12/1985 |
| EP | 0 185 365 B1 | 12/1985 |
| EP | 0 461 451 B1 | 12/1991 |
| EP | 0 463 384 | 1/1992 |
| EP | 0 546 467 A2 | 6/1993 |
| EP | 0 602 779 | 10/1993 |
| EP | 0 572 991 B1 | 12/1993 |
| EP | 0 589 757 | 3/1994 |
| EP | 0 598 469 | 5/1994 |
| EP | 00630165 B1 | 1/2000 |
| EP | 981211 * | 2/2000 |
| FR | 2 575 016 | 6/1986 |
| GB | 2 046 356 | 11/1980 |
| GB | 2 065 353 | 6/1981 |
| GB | 2 141 309 | 12/1984 |
| GB | 2 151 061 | 7/1985 |
| GB | 2 215 897 | 9/1989 |
| JP | 48-090110 | 11/1973 |
| JP | 53-039808 | 4/1978 |
| JP | 55-107375 | 8/1980 |
| JP | 57-125567 | 8/1982 |
| JP | 57-125570 | 8/1982 |
| JP | 57-127903 | 8/1982 |
| JP | 58-003367 | 1/1983 |
| JP | 58-165473 | 9/1983 |
| JP | 59-190771 | 10/1984 |
| JP | 60-180270 | 9/1985 |

| | | |
|---|---|---|
| JP | 62-054623 | 3/1987 |
| JP | 62-266960 | 11/1987 |
| JP | 02-061786 | 3/1990 |
| JP | 02-079193 | 3/1990 |
| JP | 02-245893 | 10/1990 |
| JP | 03-024684 | 2/1991 |
| JP | 03-062296 | 3/1991 |
| JP | 04-001891 | 1/1992 |
| JP | 04-043493 | 2/1992 |
| JP | 04-140896 | 5/1992 |
| JP | 04-354092 | 12/1992 |
| JP | 56-101016 | 1/1993 |
| JP | 6070367 | 3/1994 |
| JP | 06-121075 | 4/1994 |
| JP | 09-018609 | 1/1997 |
| NL | 9401004 A | 8/1995 |
| WO | WO 91/07833 | 5/1991 |
| WO | WO 93/03585 | 2/1993 |
| WO | WO 95/24107 | 9/1995 |
| WO | WO 95/35619 | 12/1995 |
| WO | WO 96/15633 | 5/1996 |
| WO | WO 98/34425 | 1/1997 |
| WO | WO 98/30037 | 7/1998 |
| WO | WO 98/34393 | 8/1998 |
| WO | WO 98/34425 | 8/1998 |
| WO | WO 98/47112 | 10/1998 |
| WO | WO 00/04701 | 1/2000 |
| WO | 01/49057 | * 7/2000 |
| WO | 00/70860 | * 11/2000 |

OTHER PUBLICATIONS

Ciancetta, M.C., J. Isberg; "Combined personal and terminal mobility in IN environment", Technical Reports, vol. XXII—No. 6- Dec. 1994, pp. 685-696.

Dunogue, J., J.B. Kerihuel, M. Martin; "The Building of Intelligent Networks Architecture and Systems from Alcatel", Commutation & Transmission No. 2—1989, pp. 5-22.

Ghillebaert, B., P. Combescure, A. Maloberti; "Le système cellulaire numérique européen de communication avec les mobiles", L'Echo des Recherches No. 131, 1$^{er}$ trimestre 1988, pp. 5-20.

Jolie, P., G. Mazziotto; "Une application de la carte á microprocesseur: le module d'identité d'abonné du radiotéléphone numérique européen", L'écho des RECHERCES No. 139, 1$^{er}$ trimestre 1990, pp. 13-20.

Mazziotto, Gérald; "The Subscriber Identity Module For the European Digital Cellular System GSM and Other Mobile Communication Systems", ISS '92, Oct. 1992, vol. 1, pp. 113-116.

Nevoux, R., J.C. Benard-Dende; "Requirements for Personal Mobility In FPLMTS/UMTS: a view point from the user's expectations", IEEE, 1994, pp. 1-7.

Shimizu, Hiroshi, and Masaki Takahashi; "Intelligent Network", NTT Review vol. 6, No. 5 Sep. 1994, pp. 67-69.

Sóderberg, Lennart; "Evolving an Intelligent Architecture for Personal Telecommunication", Ericsson Review No. 4, 1993, pp. 156-171.

J.S. Somerville, "A New Central Office Facility for Extension Number Billing of PBX Originated Toll Calls".

C. Raymond Kraus, "A Proposed Telephone Identification and Credit System".

Hiroshi Shimizu, Osamu Inoue and Hisakazu Uesaka, "Advanced Free Dial Service," JTR, Jul. 1987, pp. 15 ff.

"ATS Automated Long Distance Telephone Service User's Guide", Oct. 1983, Version 2.0, National Applied computer Technologies.

D.J. Eigen and E.A. Youngs, "Calling Card Service—Human Factors Studies," Bell System Technical Journal, Sep. 1982, vol. 61, No. 7, part 3, pp. 1715 ff.

R.G. Basinger, M. Berger, E.M. Prell, V.L. Ransom and J. R. Williams, "Calling Card Service—Overall Description and Operational Characteristics," Bell System Technical Journal, Sep. 1981, vol. 61, No. 7, part 3, pp. 1655 ff.

Chungming An and Allison B. Mearns, "Direct Dialing of Credit Card Calls," International Conference on Communications, Jun. 14-18, 1981.

Dieter Voegtlen, CP 44—A Modular SPC System for Local, Transit and Trunk Exchanges With Decentralized Processors.

Fukuo Higashiyama and Masaharu Murata, "Credit Call Service," Japan Telecommunications Review, Oct. 1980.

S.D. Lind, "Credit card standards for telecommunications: an historical review," Telecommunication Journal, 1992, vol. 59—IV, pp. 183 ff.

Allison B. Mearns, David J. Miller and Cyrenus M. Rubald, "Calling Card: Dont't tell it—dial it," Bell Laboratories Record, May/Jun. 1982, pp. 117-119.

"Emergence of debit cards brings proposal for universal, compatible numbering system," Banking, Oct. 1976, pp. 19 ff.

Charlie Stimson, "Prepaid Calling Cards—Friend or Foe?," Public Communications Magazine, Aug. 1994.

IBM Virtual Machine Facility/370: Terminal User's Guide, Release 4 PLC 1.

J.C. Lund, Jr., M.R. Ordun, and R.J. Wojcik, "Implementation of the Calling Card Service Capability—Application of a Software Methodology," IEEE Transactions on Communications, Jun. 1982, vol. COM-30, No. 6, pp. 1297 ff.

S.S. Soo, "Interfacing a Computer to a Telephone Exchange," IBM Technical Disclosure Bulletin, Sep. 1976, vol. 19, No. 4.

Masaharu Kahiara, Ginya Ishiguro, Kiyoshi Teresawa, "Magnetic Card Public Telephone," Review of the Electrical Communications Laboratories, 1984, vol. 32, No. 1.

Lynette Luna, "National Telemanagement answers prepaid wireless dilemmas," RCR Publications Dec. 16, 1996.

W.O. Fleckenstein, "Operations support systems: computer aids for the local exchange," Bell Laboratories Record, Sep. 1982, pp. 185 ff.

"Payment Systems: Europe Steals a Lead in Ship Card System, But They Pose New Problems," Europe Information Service, Sep. 9, 1993.

P. Wible, Phonocard®—a pay phone operated by prepaid cards.

Sean Millen, "POS and charge cards," Computer Decisions, pp. 40-44.

A.G. Mason, "A Pay-Per-View Conditional Access System for DBS by Means of Secure Over-Air Credit Transmission," Electronics and Computing and Control Divisions of the Institution of Electrical Engineers, International Conference on Secure Communication Systems, Feb. 22-23, 1984.

J.W. Gibbs, T.E. Longden, P.A. Trudgett, "A Small Digital Exchange With Advanced Facilities," ISS '81 CIC Montreal Sep. 21-25, 1981.

"Smart cards move into everyday use," Computer Management, Mar. 1985.

R.J. Jaeger, Jr., and A.E. Joel, Jr., "System Organization and Objectives," Bell System Technical Journal, Dec. 1970, vol. 49, No. 10, pp. 2417-2443.

J.B. Kerihuel, G.M. Martin, "How the Intelligent Network Will Federate Services Related to Mobility," Third IEE Conference on Telecommunications, The Institution of Electrical Engineers, 1991.

P.D. Bloom and B.L. Breedlove, "The Feature Node/Service Interface Concept".

The Market for Central Office Equipment, TE&M Special Report, Dec. 1, 1977, vol. 92, No. 23.

Freeman, "Are prepaid applications 'on the fringe' or infringing?," Intele-Card News, Jan./Feb. 1996.

Harry M. Hall, Christopher D. Carson, Earle H. West, and Lonnie D. Whitehead, "The AT&T Service Circuit Node: A New Element For Providing Intelligent Network Services," AT&T Technical Journal at 72, Summer 1991.

Kevin Hegebarth, "ANI is the key to unlock advanced network services," Telephony, Nov. 14, 1988.

Notes on the BOC INTRA-LATA Networks Prepared by Network Planning Central Services Organization on behalf of the Regional Bell Operating Companies, American Telephone and Telegraph Company, 1980, 1983.

White, James A., "Western Union Buys 50% AirFone Stake; Airlines Sign for In-Flight Phone Service," The Wall Street Journal, Thursday, Dec. 17, 1981.

Alexandra M. Workman, Murthy V. Kollpakam, Janis B. Sharpless, Vilma Stoss, and Hans van der Veer, "International Applications of AT&T's Intelligent Network Platforms," AT&T Technical Journal, Summer 1991.

Simon Wyatt, "Telephone Decrementing Card," Communications International, Jul. 1981.

Krayem-Nevoux, "Payphone Service for Third Generation Mobile Systems," 1993 IEEE, pp. 1708-1712.

"CTIA Products," Telephony, Feb. 23, 1998.

Bauer, "The network of your dreams: Picking the ideal intelligent network infrastructure involves a comprehensive checklist of vendor criteria, including network applications, scalability and reliability," Telephony, Feb. 23, 1998.

Biagi, "The big switch: Intellicall brings its prepaid calling service offering to the U.S.," Telephony, Jul. 20, 1998.

Briere, "Speaking in tongues," Telephony, Feb. 14, 1994, 226(7).

Briere, "Can the RHCs win the long-distance marathon?," Telephony, Feb. 20, 1995, 228(8).

Bucholtz, "In an instant," Telephony, Apr. 20, 1998.

Bucholtz, "High expectations: Electric Lightwave accuses US West of inadequate customer support," Telephony, Jul. 14, 1997.

Bucholtz, "Working in tandem: Five smaller vendors join in end-to-end NT-based customer care architecture," Telephony, Sep. 22, 1997.

Carter Asset allocation: Xedia helps service providers provision precious bandwidth, Telephony, Sep. 15, 1997.

Davis, "Heading toward a new Frontier: Fifth-largest U.S. long distance carrier streamlines for growth," Telephony, Oct. 20, 1997.

Davis, "The gift that keeps on giving: BellSouth targets holiday shoppers for digital phones," Telephony, Nov. 17, 1997.

Davis, "Here comes the smart card is a cashless society reality or rigmarole?," Telephony, Feb. 17, 1997.

Gohring, "Europe sets pace for prepaid: U.S. follows, but only as a last resort," Telephony, Mar. 2, 1998.

Gohring, "Lucent adds WIN applications," Telephony, Apr. 6, 1998.

Gohring, "Canadian PCS operators rock the boat," Telephony, Jun. 1, 1998.

Guihat, "An AIN wish list: Multimedia-enhanced services may be the next step for the Advanced Intelligent Network," Telephony, Sep. 22, 1997.

Interim European Telecommunication Standard 300 131.

Kenny, "The anti-bill" Telephony, Jun. 28, 1999.

Langner, "RHCs sail into unfamiliar waters," Telephony, Sep. 19, 1994, 227(12).

Lindstrom, "Prepaid calling cards set to peak," Telephony, Jul. 10, 1995, 229(2).

McElligott, "Prepaid Compaq: BT Cellnet displays intelligent network-based prepay," Telephony, Jun. 5, 2000.

Meyers, "SmarTalk adds PCs to menu," Telephony, Jan. 13, 1997, 232(2).

Meyers, "The best tools for the job," Telephony, Apr. 22, 1996, 230(17).

Meyers, "Improvement, inside and out," Telephony, Apr. 22, 1996, 230(17).

Meyers, "Giving wireless an edge," Telephony, Jul. 22, 1996, 231(4).

Meyers, "Portable potential," Telephony, Jul. 31, 1995, 229(5).

Meyers, "New dog, new tricks, Nortel supplies smarts for Microcell's Fido," Telephony, Aug. 25, 1997.

Meyers, "Sending a message: Unisys opens its wireless platforms to more carries," Telephony, Sep. 22, 1997.

O'Shea, "LHS floats amid PCS chaos," Telephony, Jun. 30, 1997.

O'Shea, "Software deals rule the sky," Telephony, Sep. 15, 1997.

O'Shea, "The business of getting personal: Patent agreement illustrates growing market competition," Telephony, Dec. 1, 1997.

O'Shea, "Services come into operational fold: Prepaid and messaging ride a tidal wave of popularity," Telephony, Mar. 23, 1998.

O'Shea, "After the discovery competition increases in software-based enhanced services," Telephony, Mar. 31, 1997.

O'Shea, "Software, network management drive next wireless era," Telephony, Apr. 22, 1996, 230(17).

O'Shea, "Breaking the mold," Telephony, Jun. 23, 1997.

O'Shea, "Debit cards play the field," Telephony, Aug. 22, 1994, 227(8).

Purton, "Germany tears down wall—and finds an aging network to rebuild," Telephony, Mar. 4, 1991, 220(9).

George Leon, "Smart Card—makes smart sense," Electronic Education, Feb. 1984, vol. 3, No. 6.

"Telecom voices cross continents with messages of progress," Telephony, Feb. 22, 1988, 214(8).

"Vicorp targets global," Telephony, Sep. 1, 1997.

Vittore et al., "Underlying control," Telephony, Jul. 6, 1998.

* cited by examiner

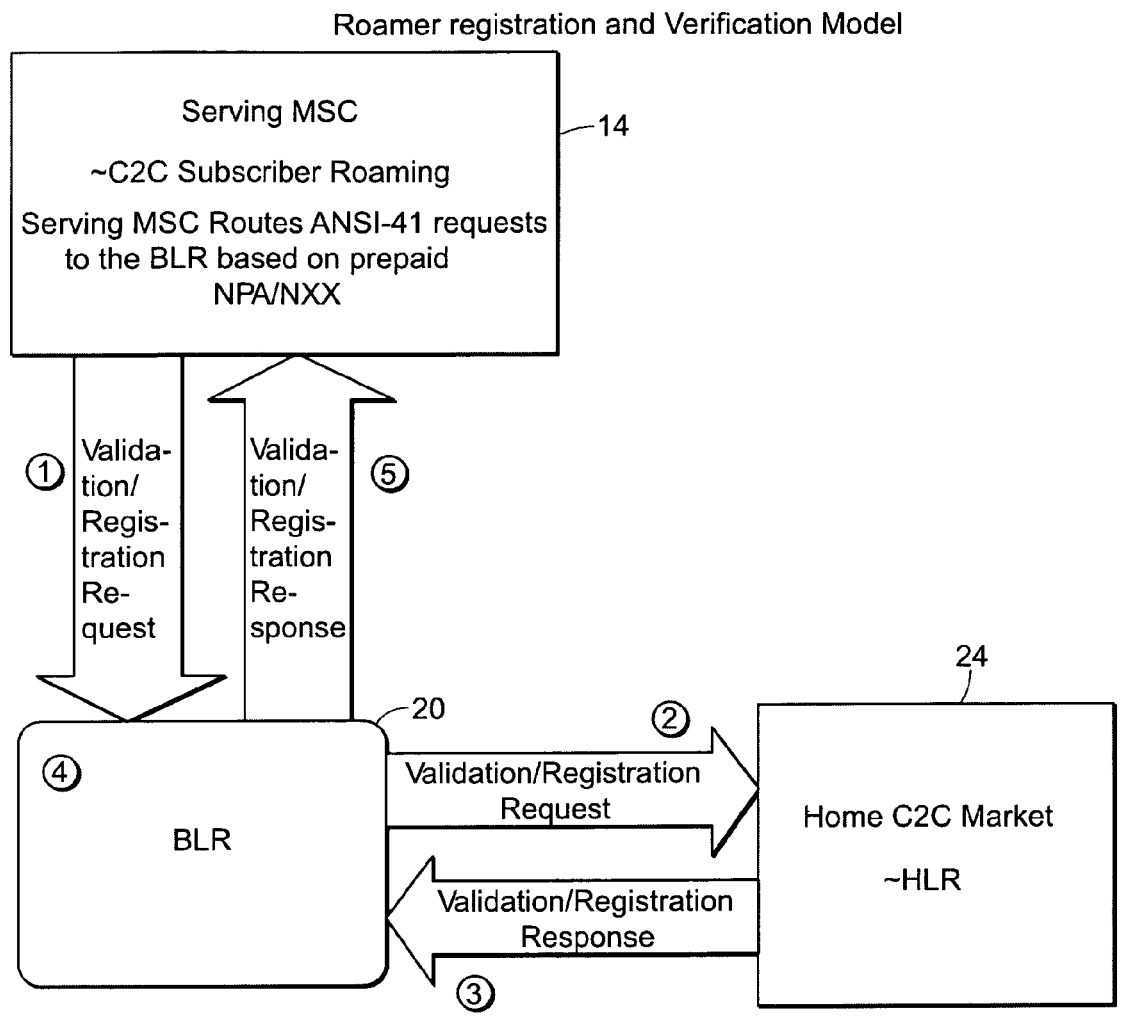

Roamer registration and Verification Model

FIG. 3

① C2C roamer requests registration in servicing MSC. Serving MSC requests caller's roaming profile from BLR based on prepaid NPA/NXX ② BLR requests caller's roaming profile from the HLR ③ HLR returns roamer profile and then stores the subscriber's location ④ The BLR will determine the Class of Market for the serving market. If it is a Hotline Roaming market, the BLR will return " Origination via hotline# & term. denied" to the serving MSC.
If it is a Seamless Roaming market, the BLR will return "Origination denied and Termination denied" to the serving MSC.

⑤ BLR returns roamer profile to serving MSC.

CALL DELIVERY SYSTEMS FOR ROAMING PREPAID SUBSCRIBERS

REFERENCE TO RELATED APPLICATIONS

This application claims priority to U.S. Ser. No. 60/109,633 filed 24 Nov. 1998, entitled SYSTEMS AND METHODS FOR PROVIDING CALL DELIVERY SERVICES; AND U.S. Ser. No. 60/109,893 filed 25 Nov. 1998, entitled SYSTEMS AND METHODS FOR PROVIDING CALL DELIVERY SERVICES, the contents of which are hereby incorporated by references.

FIELD OF THE INVENTION

This invention relates to methods and systems for allowing prepaid subscribers to roam among service markets.

BACKGROUND OF THE INVENTION

Cellular mobile telephone services are currently one of the most rapidly expanding types of communication services. They have been in operation in the continental United States for nearly a decade and have been offered in many other parts of the world for several years.

Whereas cellular mobile telephone services were once limited to relatively small geographic home areas, they have since evolved to permit expanded service across state and national boundaries through "roaming" agreements. This expansion has served the commercial objectives of mobile telephone service providers by providing roaming mobile subscribers the ability to freely and quickly automatically originate and receive telephone calls from other fixed or mobile stations in the network.

Roaming services have allowed cellular subscribers who travel or "roam" away from their home markets to use their mobile phones in these new markets. Typically, when a subscriber first enters a roaming market or "powers up" the cellular telephone in a roaming market, the phone's unique MIN and ESN are transmitted to a serving carrier of the serving market. These numbers identify to the serving carrier that the subscriber whose access codes have been transmitted is not a local subscriber. Utilizing an IS-41 network, the server requests registration data from the subscriber's home carrier which corresponds to the received MIN/ESN. This registration data is delivered via the IS-41 network back to the serving market to provide information to the serving carrier regarding the subscriber's call features and restrictions and to enable the carrier to make a decision whether or not to provide service. The system then validates that a particular MIN/ESN is entitled to roaming privileges. Optionally, these roaming systems can also include functionality to guard against clone fraud which in recent years has dramatically increased.

One known system for preventing and detecting cloning fraud is provided by GTE Telecommunication Services, Inc. (GTETSI). GTE TSI provides a clearing-house validation service by maintaining a "positive" database of valid subscriber MIN/ESNs and a "negative" database of invalid subscriber MIN/ESNs. When a call is received by the GTE TSI system, a lookup is performed against the positive and negative databases to determine if the MIN/ESN combination is valid. If not, the MIN/ESN is entered into the negative database. Thus, this systems provides a subscriber with some protection against fraudulent use of the subscriber's ESn and MIN.

In addition to roaming services, the use of mobile telephones has also expanded in part due to new services, such as prepaid calling services, that allow a whole new segment of users to take advantage of mobile voice and data services. For example, users that lack credit histories or users that want to provide third parties with a mobile telephone, but still retain some control over the cost of providing such services, may subscribe to prepaid telephone services, allowing them to pay in advance for telephone calls. These systems operate by providing the subscriber with a debit account or a debit card that the subscriber can draw finds from to pay for a telephone call. Each time the prepaid subscriber makes a call, the call is routed through a prepaid platform. At the platform, the funds available to the subscriber are checked, and the subscriber is allowed to make a call while funds are available. As funds become depleted, the prepaid platform issues an audible warning to the subscriber and eventually terminates the call. Thus, the subscriber can budget the amount of money that the subscriber wants to spend on phone services and can use the prepaid service as a way of limiting expenditures and reducing cost overruns.

Although roaming and prepaid services have become very popular within the mobile phone users, these services exist separately, and therefore a prepaid user has not had the ability to use their phone service outside of their home market. Specifically, the roaming systems that exist today can support a traditional credit subscriber by keeping track of that subscriber's use of the serving market's circuits and subsequently billing the subscriber through their home market provider. However, most roaming systems do not have access to the debit account information for a prepaid customer, nor do they have access to a prepaid platform that can warn the subscriber as the funds begin to deplete, or terminate a call once the finds are spent. Thus, most remote serving markets cannot support a roaming prepaid subscriber.

Accordingly, there exists a need for a roaming system that can provide seamless roaming to a prepaid subscriber.

SUMMARY OF THE INVENTION

It is an object of the present invention to provide roaming systems that support a prepaid subscriber as he travels between different serving markets, and different types of serving markets.

It is another object of the present invention to provide roaming systems for prepaid subscribers that guard against fraud, and to prevent unmetered call delivery through a serving carrier's roamer port.

Other objects of the invention will, in part, be obvious, and, in part, be shown from the following description of the systems and methods shown herein.

Generally, the systems and methods described herein operate to provide seamless roaming to a prepaid subscriber in as many markets as possible. To that end, the systems of the invention include a location register (LR) that can determine the type, or class, of serving market with which the roaming subscriber is registering. Once the class of the serving market is identified, the LR can modify a subscriber's profile as a function of this class, and return to the serving market a profile that will allow the serving market to employ the prepaid platform that services the subscriber and thereby provide services to the roaming subscriber. In optional embodiments, the LR may also respond to location requests from the prepaid platform. The location information may be employed by the subscriber to determine a rate structure for a call, and thereby decrement the subscriber's balance as a function of, at least in part, the location of the roaming subscriber.

BRIEF DESCRIPTION OF THE DRAWINGS

The foregoing and other objects and advantages of the invention will be appreciated more fully from the following further description thereof, with reference to the accompanying drawings wherein;

FIG. 3 depicts a data flow diagram illustrating the exchange of data between a serving MSC and a location register suitable for use with the system depicted in FIG. 1;

DESCRIPTION OF THE ILLUSTRATED EMBODIMENTS

To provide an overall understanding of the invention, certain illustrative embodiments will now be described. However, it will be understood by one of ordinary skill in the art that the systems and methods described herein can be adapted and modified for other suitable applications and that such other additions and modifications will not depart from the scope hereof.

Figure 1:
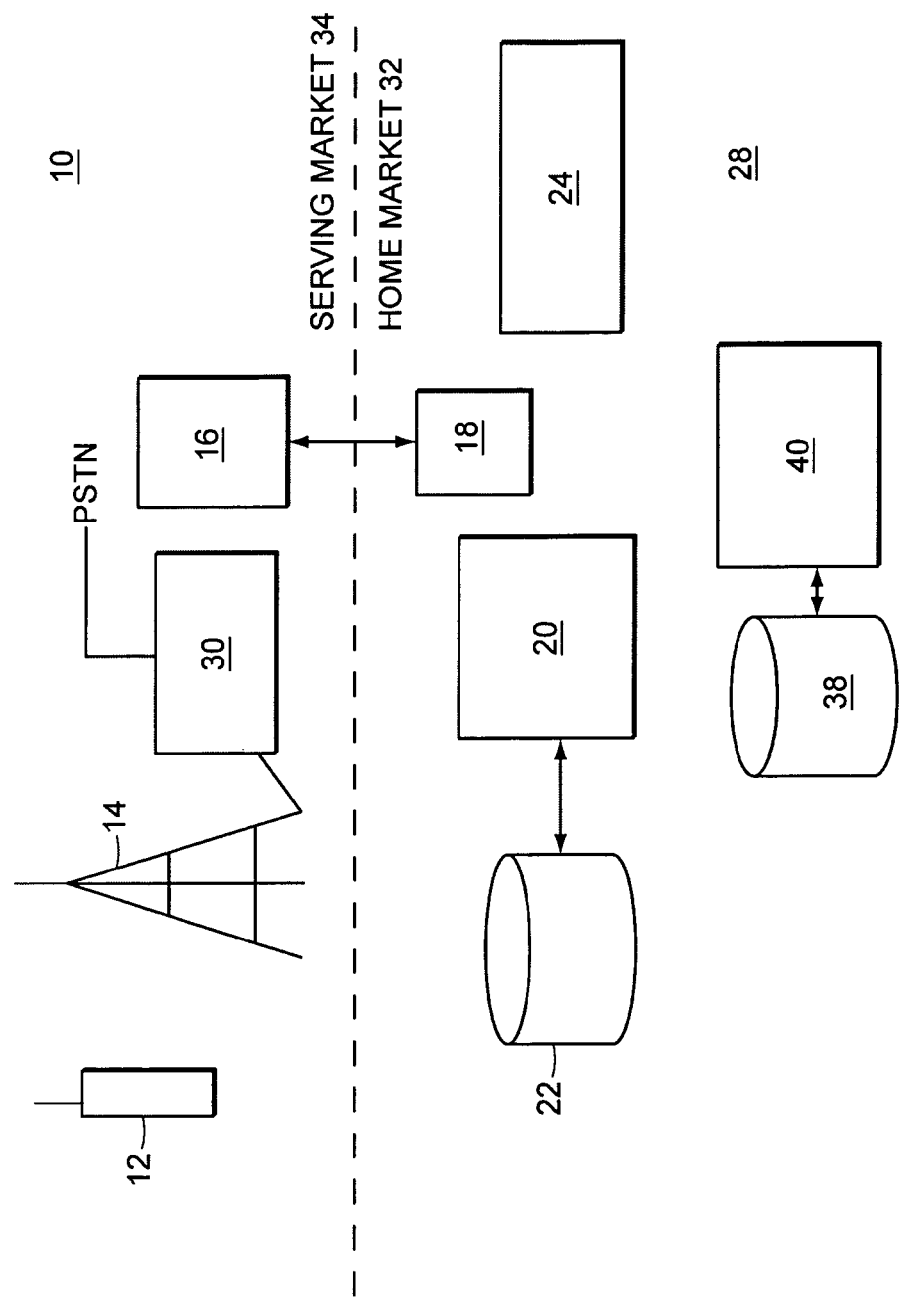
FIG. 1 depicts a functional block diagram of one system according to the invention for allowing a prepaid subscriber to roam into different service markets.

The system depicted in FIG. 1 provides seamless mobile origination and call delivery services for prepaid subscribers that are roaming within or outside a prepaid market. As will be shown in greater detail hereinafter, these systems include a location register, such as the depicted location register 20, that is capable of modifying a subscriber's profile as a function of the class of serving market. The modifications made to the subscriber profile are designed to direct the operation of the switch MSC. Once the profile is modified the location register returns the modified profile to the serving MSC. The MSC responds to the modified subscriber profile to operate in a way that provides the roaming prepaid subscriber with seamless roaming privileges outside of the subscriber's home market.

Specifically, FIG. 1 depicts one embodiment of system according to the invention wherein a roaming subscriber, depicted in FIG. 1 by the subscriber phone unit 12, is capable of roaming into different server markets, including different types of server markets, and being provided prepaid communication services by a prepaid platform that can communicate with the roaming subscriber. For purposes of illustration, FIG. 1 depicts this system 10 as a functional block diagram that illustrates a subscriber phone unit 12, a mobile switching center (MSC) 14, a local signal transfer point (STP) 16, a home STP 18, a location register 20, a database 22, an external Home Location Register (HLR) 24, a prepaid service platform database 28, and a prepaid service voice node 30. FIG. 1 further depicts the Home market 32 as being separated from the Serving market 34 by the dashed line.

The system 10 is shown as a conventional cellular system that supports voice and data communications. However, it will be apparent to those of ordinary skill in the art that the invention may be used with any suitable mobile or wireless network. For example, the system may comprise a GSM network, a TCP/IP network, or a protocol developed in the future.

FIG. 1 further depicts that the elements of the system 10 may include conventional telecommunication equipment, such as for example the telephone unit 12 being employed with the system for allowing a prepaid subscriber to roam. Additionally, the system 10 can employ other types of wireless communication device including any type of cellular communication devices, such as a cellular phone, or a wireless PDA.

The depicted MSC 14 can also be a conventional telecommunication device, specifically a mobile switching center of the type commonly employed with cellular networks. The MSC 14 can couple to an STP 26 also of the type commonly used for transferring data, such as for transferring data onto an SS7 intelligent network. Similarly, the STP 18 depicted in FIG. 1 can also be employed for transferring such data and can be in communication with the depicted STP 16. At the MSC or the STP 16, a database can be provided that stores point codes for NPA/NXX numbers. These point codes can direct the MSC 14 to the appropriate location register for a roaming caller trying to register with the MSC 14.

FIG. 1 further depicts that the system 10 can include a Home Location Register (HLR) 24 of the type employed with cellular networks, and can further include a prepaid call processing platform 28. The prepaid call processing platform 28 can be any suitable prepaid platform including the $C_2C$ prepaid call processing platform manufactured and sold by the assignee hereof. The prepaid platform 28 may act as a centrally located database that includes information about the accounts of each subscriber of the prepaid system. This account information may include for each subscriber the amount of funds available to that subscriber, as well as other account information, such as any free calling time available to that subscriber, and other such information. This account information may be stored information. This account information may be stored in a database 38 that comprises part of the prepaid platform 28. The prepaid platform 28 may also comprise a rating engine 40 that processes the account information for a subscriber and determines from the account information a time interval representative of the number of minutes the subscriber can talk for. Other methods for regulating the call may also be practical.

In the serving market 34, a prepaid voice node is present that is capable of processing a call for a prepaid subscriber. The prepaid voice node 30 is capable of connecting a prepaid subscriber to a communication network, such as the PSTN, and is capable of regulating the call as a function of the time interval determined by the prepaid platform 28. Thus, the prepaid voice node acts as a switch that connects the subscriber through the MSC 14 and on to the PSTN.

FIG. 1 further depicts that the system 10 includes a location register (LR) 20 that communicates with the HLR 24 and the prepaid platform 28. The LR 20 is typically a data processing system that couples into the network and that receives and processes request for data. In one embodiment, the LR 20 comprises a conventional data processing platform, such as an IBM PC-compatible computer running the Windows operating systems, or a SUN workstation running the Solaris operating system. Alternatively, the data processing system may comprise a dedicated processing system that includes an embedded programmable data processing system for transferring and processing data exchanged over the communication network. For example, the LR 20 may comprise a single board computer system that has been integrated into an MSC at a cellular site within the network, such as at a cellular site associated with the home market of the roaming subscriber. In either case, the LR 20 will therefore comprise a software component operating on the data processing system. The software component program can be a C language computer program, or a computer program written in any high level language including C++, Fortran, Java or Basic. Additionally, the LR 20 can be realized as a computer program written in microcode or written in a high level language and compiled down to microcode that can be executed on the platform employed. Although the system 10 of FIG. 1 depicts a single LR unit 20, it will be understood by those of ordinary skill in the art, that a plurality of such location registers can be connected into the network.

Figure 2:
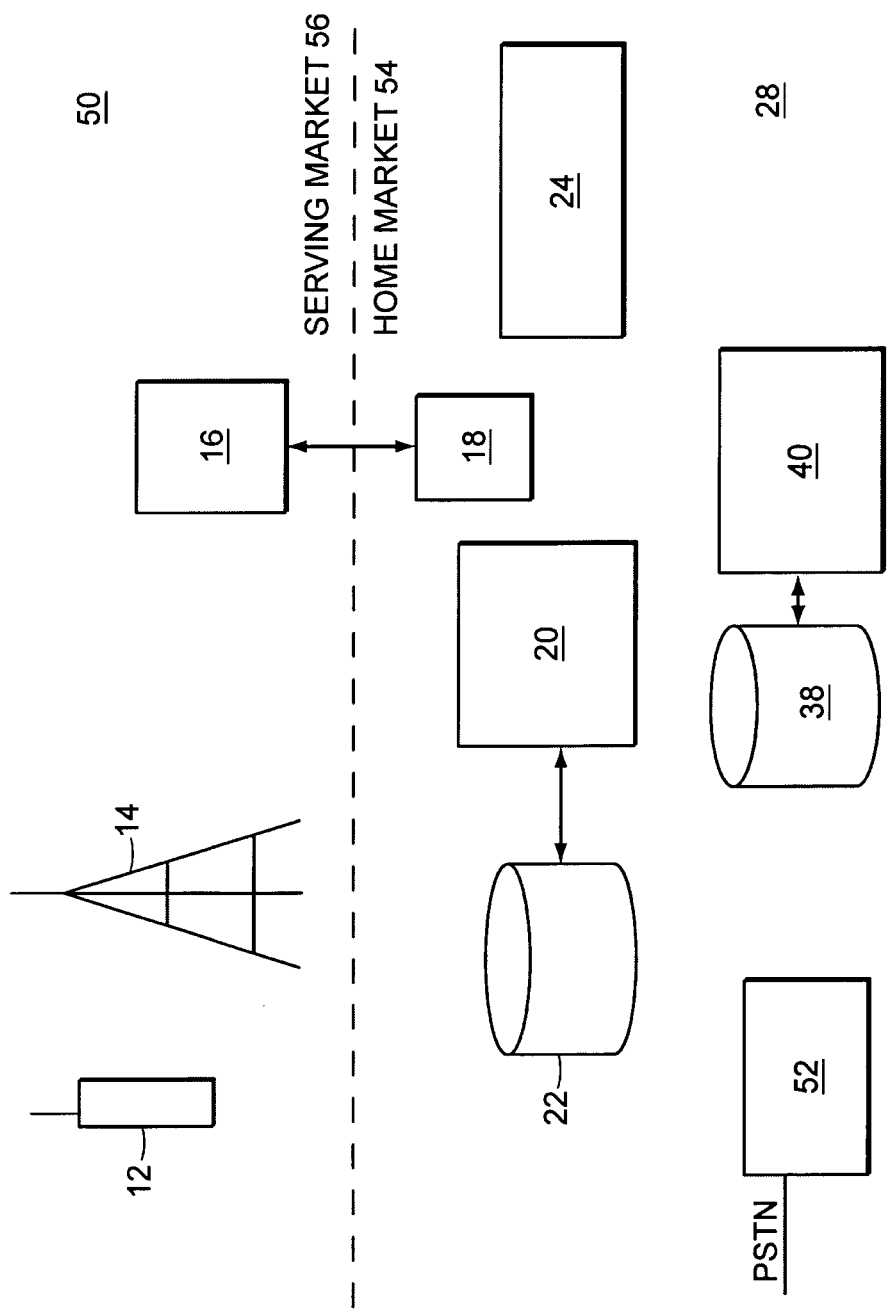
FIG. 2 depicts a functional block diagram of one system according to the invention that allows a roaming prepaid subscriber to access a prepaid platform in a remote serving market for call processing.

It will also be seen that the system 10 of FIG. 1 includes a database 22 that communicates with the LR 20 and that can store subscriber profiles for use by the system, as well as a look up table that includes information for resolving for a given serving market the associated class of market. For example, the LR 20 can store a table that distinguishes between two types of serving markets, those saving markets that have a prepaid voice node and those that do not. By way of illustration, it can be seen that the serving market 34 has a prepaid voice node 30. Thus, as will be shown below, the LR 20 may modify the subscriber profile to instruct the switch MSC 14 to pass the subscriber's call to the prepaid voice node 30. In contrast, turning to FIG. 2, a system 50 can be seen, which is similar to the system 10 however the serving market 56 lacks a prepaid voice node. Instead, with system 50 a prepaid voice node that can be employed by the system is located in the home market 54. Thus, the LR 20 will adjust the subscriber's profile to employ the prepaid voice node 52 in the home market 54. Thus, the system divides markets into classes based on the system's ability to control call processing. The depicted database 22 may be any suitable database system, including the commercially available Microsoft Access database, and may be a local or distributed database system. The database 22 may be supported by any suitable persistent data memory, such as a hard disk drive, RAID system, tape drive system, floppy diskette, or any other suitable system. The system depicted in FIG. 1 includes a database device 22 that is separate from the LR 20, however, it will be understood by those of ordinary skill in the art that in other embodiments the database device 22 may be integrated into the LR 20.

In operation, the subscriber of the prepaid cellular service has a mobile telephone unit 12 that has associated with it an MIN and ESN as well as an NPA/NXX which identifies the subscriber as a prepaid cellular user. When the subscriber signs up for cellular service, a subscriber service profile is stored for that subscriber in a database maintained by the home carrier MSC for that subscriber, or alternatively in a centrally located database, such as the external HLR 24. The subscriber's service profile can include data indicating that the MIN is allowed to originate calls while roaming, that the MIN can dial internationally, that automatic call delivery is active and that the MIN is associated with other such services. Other types of information can also be associated with the subscriber's service profile and all such information is deemed to be within the scope of the present invention. The data carried in the profile tells the switch MSC 14 how to handle the caller. For example, the data in the service profile can tell the MSC 14 to route the caller to a prepaid platform or to deny the caller the ability to originate or receive a call. The codes, parameters or other information contained in the service profile that will effect operation of the switch can vary depending upon the application and the programming of the switch MSC 14.

Accordingly, in one practice, the LR 20 can coordinate with the MSC to determine which of the parameters in the profile to change and what values to change these parameters to so that the MSC can respond as appropriate. This information may be encoded into a table, such as TABLE 1 below, that sets forth for each serving market, the class of serving market it is as well as the list of parameters that are to be changed by the LR 20 to effect the desired response from the MSC 14.

Upon entering the foreign serving market, the subscriber activates the mobile phone unit 12 and the phone 12 begins a registration process with the serving MSC 14. In this process the mobile phone unit 12 delivers the NPA/NXX to the MSC 14. The MSC 14, or optionally, the STP 16, maintains a databse of NPA/NXX numbers each of which has a point code associated with the number. In the system of FIG. 1, the NPA/NXX for prepaid subscribers is set to a point code tha refers the MSC 14 to the LR 20. Thus, upon receipt of the NPA/NXX the serving MSC 14 will request, based on the NPA/NXX provided by the subscriber, the caller's roaming profile and validation from the LR 20. Ths process is illustrated in FIG. 3, which depicts the flow of data in the between elements of the systems 10 and 50 for registering a roaming prepaid subscriber.

Specifically, FIG. 3 depicts that the LR 20 receives the request and forwards the request, or makes a separate request, to the HLR 24 associated with the roaming subscriber To this end, the LR 20 may include a database or have access to a database that includes information that identifies the HLR associated with a particular subscriber. The HLR 24 identifies the caller's roaming profile and delivers that profile to the LR 20. Optionally, the HLR 24 receives location information from the MSC 14, through the LR 20, and the HLR stores this location information for later use.

As described above, once the LR 20 has the profile, the LR 20 will modify the profile to direct the operation of the switch MSC 14 for processing a call for the prepaid subscriber. To modify the profile, the LR 20 determines the class of serving market associated with the MSC 14 and presently servicing the subscriber. In a first practice, the LR 20 processes the data provided by the MSC 14 during the profile request operation. For example, under SS7 the messaging between the MSC 14 and the LR 20 can include an identifier for the MSC 14, such as an MSCID parameter. The LR 20 may employ the the identifer for performing a look up operation within a table, such as TABLE 1, stored in the database 22. In other embodiments where an identifier is not passed to the LR 20, the LR 20 may query the MSC 14 for an identifier indicating the type or class of serving market, or providing a unique identifier that may be employed by the LR 20 to determine the class of serving market associated with the MSC 14.

In one practice, every serving market can be divided into one of two classes or types, the first type being those serving markets that have a prepaid voice node and the second type being those serving markets that do not have a prepaid voice node. In this practice, those serving markets that are identified as having a prepaid voice node can be provided a modified subscriber profile that will direct the roaming prepaid subscriber to serving market's prepaid platform. These markets may be refered to as Seamless roaming markets. Those serving markets that are identified as not having a prepaid voice node can be provided a modified subscriber profile that will direct the roaming prepaid subscriber to a prepaid platform outside of the serving market area. These serving markets may be referred to a Hotline roaming markets. Other classifications of serving markets may be employed by the LR 20 for modifying the subscriber profile, and the use of such other classifications will not depart from the scope of the invention.

Once the determination of the class of serving market is made, the LR 20 can determine the modifications that are to be made to the subscriber profile. In one example wherein the LR 20 receives an identifier for the serving market that may be employed for accessing a look up table that includes information for modifying the susbcriber profile. One example of such a table, is the Table 1 presented below.

TABLE

| SERVING MARKET | A | B |
|---|---|---|
| MARKET CLASS | PREPAID | NOT PREPAID |
| LIST OF PARAMETERS TO MODIFY | ORIGINATION INDICATOR = 3 | RESTRICTION DIGIT = 8887761234 |

Table 1 depicts one example of a data structure that may be employed by the LR 20 for modifying the subscriber's profile. Specifically, Table 1 depicts a table that includes information on two serving markets, serving markets A and B. As described above the parameters A and B can correspond to an identifier, such as the MSCID, associated with the serving market. For each serving market depicted in Table 1 information is stored about its market class and the list of parameters that are to be modified in order that the MSC of the serving market be provided with the appropriate information for handling the prepaid roaming subscriber. In the example provided by Table 1, the serving market A is described as a market having a prepaid platform, and therefore as a seamless roaming market. For this serving market A, Table 1 lists that the parameter "ORIGINATION INDICATOR" is to be modified to be 3 before being forwarded to the MSC 14 for the serving market. Similarly, Table 1 shows that for the serving market B, the market is defined as a market not having a prepaid platform. For this market, the parameter "RESTRICTION DIGIT" is to be modified to be "886671234". Other parameters within the profile may be modified and it will be understood that the modifications that may be made to the profile will depend upon the application and the operating of the switch for the serving market. These modifications can be determined using any suitable technique, including reviewing the operation of the serving switch and forming an agreement with the carrier or switch owner so that the parameters modified by the LR 20 will direct the operation of the switch as desired.

Figure 4:
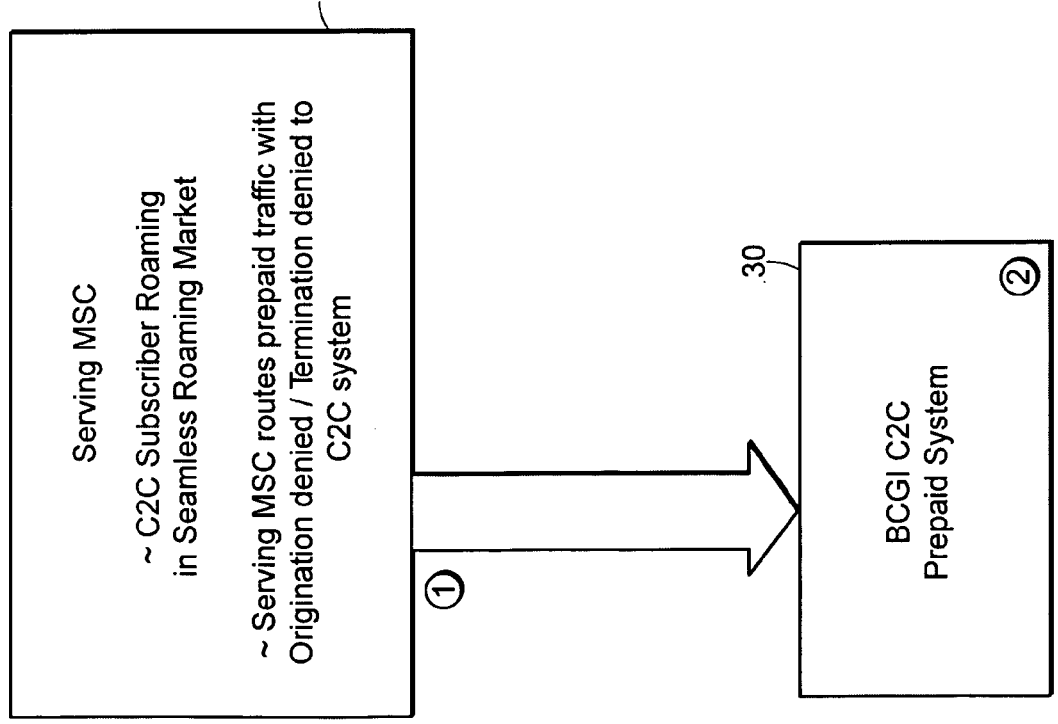
FIG. 4 depicts a data flow diagram for one process according to the invention when the roaming call origination occurs within a seamless roaming market.

Tuning back to FIG. 3, the LR 20 will return the modified profile to the MSC 14 to complete the validation and registration process for the subscriber. The operation of the system turns on the class of the serving market. FIG. 4 depicts the operation of the network for a serving market that includes a prepaid platform. Continuing with the example presented in Table 1, the LR 20 will modify the profile to set the parameter "ORIGINATION INDICATOR" to 3. This modification is understood to provide the MSC 14 with an instruction to forward the subscriber to the prepaid platform within that serving market, such as the prepaid platform 30 of the serving market 34 depicted in FIG. 1. Thus, when the MSC 14 checks the visitor location register to get the roaming profile for the subscriber, the MSC 14 sees a profile that has the "ORIGINATION INDICATOR" set to 3, which optionally can be the setting for all prepaid traffic handled by the MSC 14. Therefore, as shown in FIG. 4, the serving MSC 14 will route the prepaid roaming caller along with all other prepaid callers to the local prepaid system 30. The prepaid system 30 can act as a voice node that controls the call processing for the subscriber. In one practice, the prepaid system 30 accesses the prepaid database and rating engine 28 to determine for that subscriber the interval of time available to the subscriber given their account information. As discussed above, the prepaid database and rating engine can be a centrally located system that can be accessed by any prepaid platform voice node in any serving market. In one practice, the prepaid platform 30 employs the MN, ESN, the dialed number and NPA/NXX numbers provided by the MSC or other element to access account information from the central database 28. However, in those systems where this and other such information is not provided, the prepaid platform can request that the subscriber reenter this information to provide the rating system with the information for collecting the account information and for performing the rating process.

If the serving MSC 14 is determined to be a Hotline Roaming market, generally the LR 20 will modify the profile to provide the MSC 14 with a hotline number that the MSC 14 may employ for routing the roaming prepaid subscriber to a prepaid voice node at a remote serving market. Thus, the LR 20 will return an "origination via hotline number" parameter and an appropriate "hotline" number to the serving MSC 14. For example, Table 1 shows the serving market B as not having a prepaid platform. For this exemplary serving market, the system can modify the profile to set the parameter "RESTRICTION DIGIT" to 8887761234, which may be a "hotline number" selected according to a system criteria. One such criteria is to employ the serving MSCs SID/BID obtained from the prepaid system 28 to identify the most economical prepaid system. In other systems a default number is employed. Still in other systems, the home market for the roaming subscriber can set the hotline number. Other techniques for determining where to route the call to can be practiced with the present invention without departing from the scope hereof.

Figure 5:
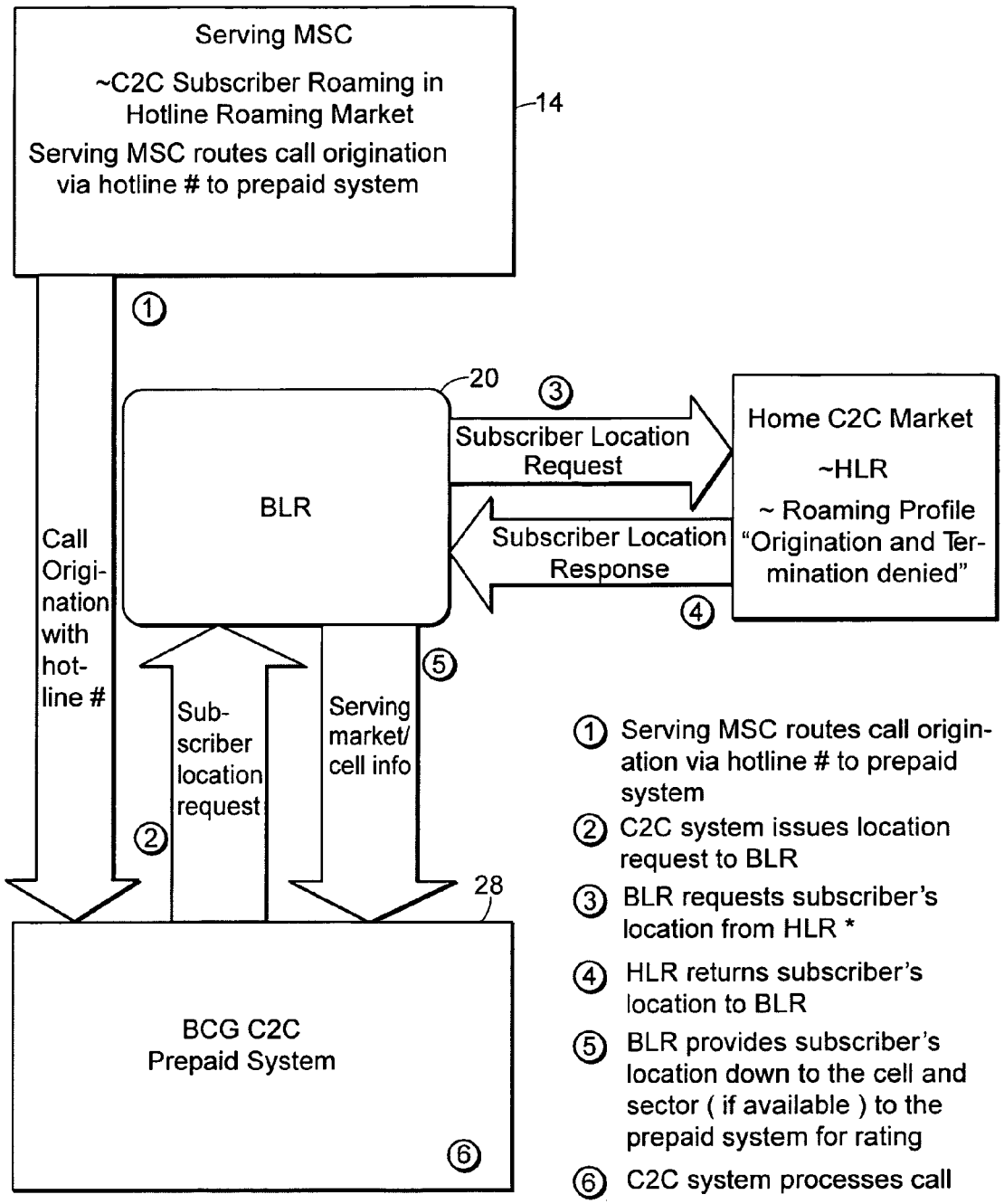
FIG. 5 depicts a data flow diagram for a process according to the invention wherein the location register allows a roaming subscriber to originate a call within a hot line roaming market.

The Call originations made by the subscriber while roaming in a hotline roaming market will be completed via the hotline number, as shown in FIG. 5. Here the hotline number allows the MSC 14 to route the call to the prepaid platform in another market, such as the prepaid voice node 52 in the home market 54. For some types of call originations, the prepaid system 52 may request the subscriber location from the LR 20. The LR 20 may store the subscriber location, or the LR 20 may need to request the Subscriber Location from the HLR 24. If the serving market 56 does not send SS7 signaling with the subscriber's MIN and the digits dialed, the prepaid system 52 may need to prompt the subscriber to re-enter dialed digits and the subscriber's MIN. If the serving market does send SS7 signaling with the MIN and digits dialed information, it is likely that the prepaid system 52 will not need to prompt for the MIN, but it is still possible that the prepaid system 52 will need to prompt for the digits dialed. The subscriber location information can be provided to the rating system for allowing the rating system to employ the subscriber's location in determining how to rate the call.

It will be noted that for an HLR provided roaming market, the LR 20 will pass through any messages provided by the HLR 24. Thus, the LR 20 will pass directly to the HLR 24 registration requests that are not for prepaid subscribers. As described above, there will also be other messages that the LR 20 will need to "pass through", such as deregister messages, to either the HLR 24 or the serving MSC 14. This allows the markets to employ sections of the profile for proprietary purposes. Optionally, these operations apply not only to roamer registration requests, but to any message, including ANSI-41 messages, in which a subscriber profile or subscriber status is requested. In a further optional practice, the LR 20 may store the subscriber's location, that can in turn be passed to the HLR 24 down to the lowest level of granularity supported.

Figure 6:
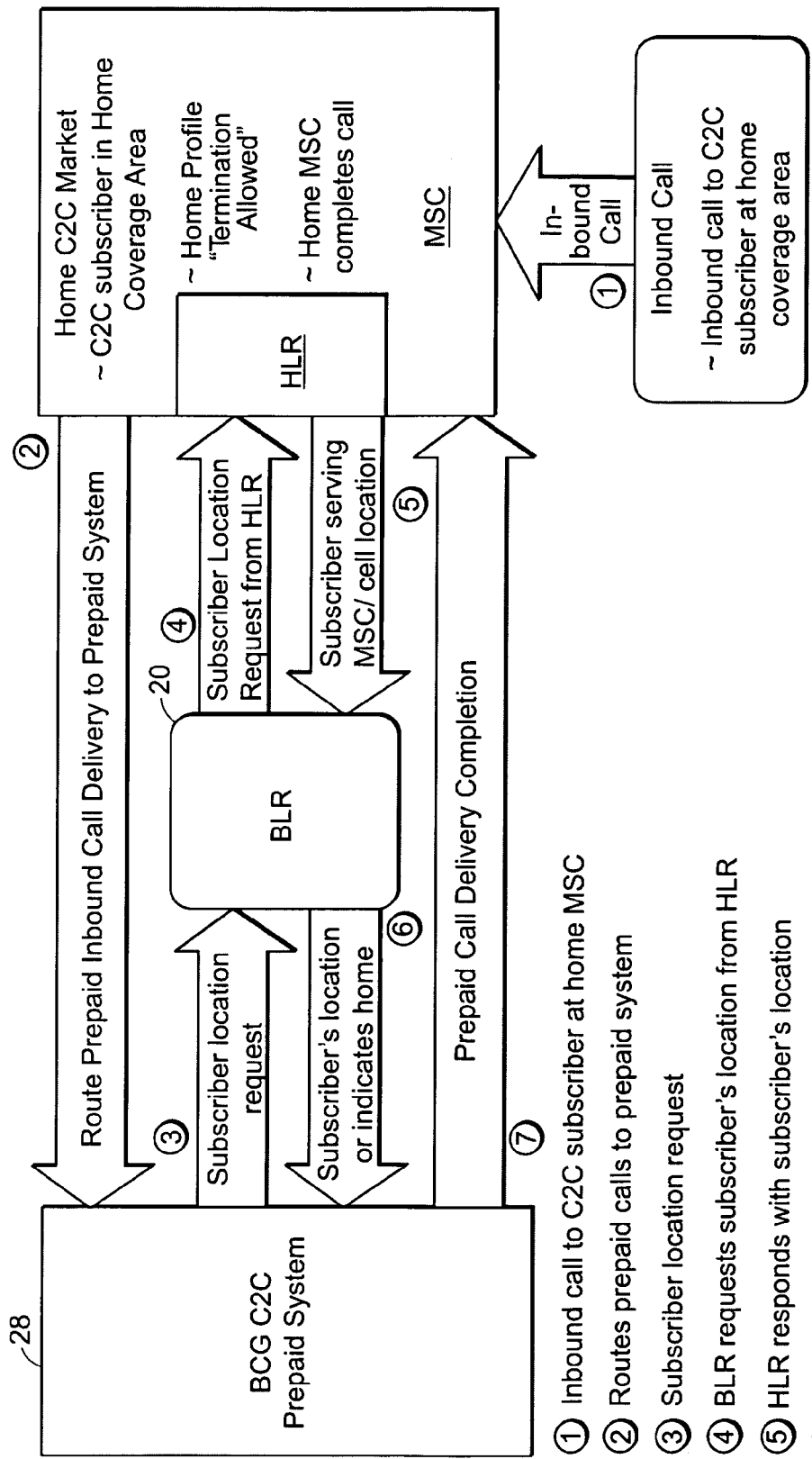
FIG. 6 depicts a call termination model for a subscriber within a home market.
Figure 7:
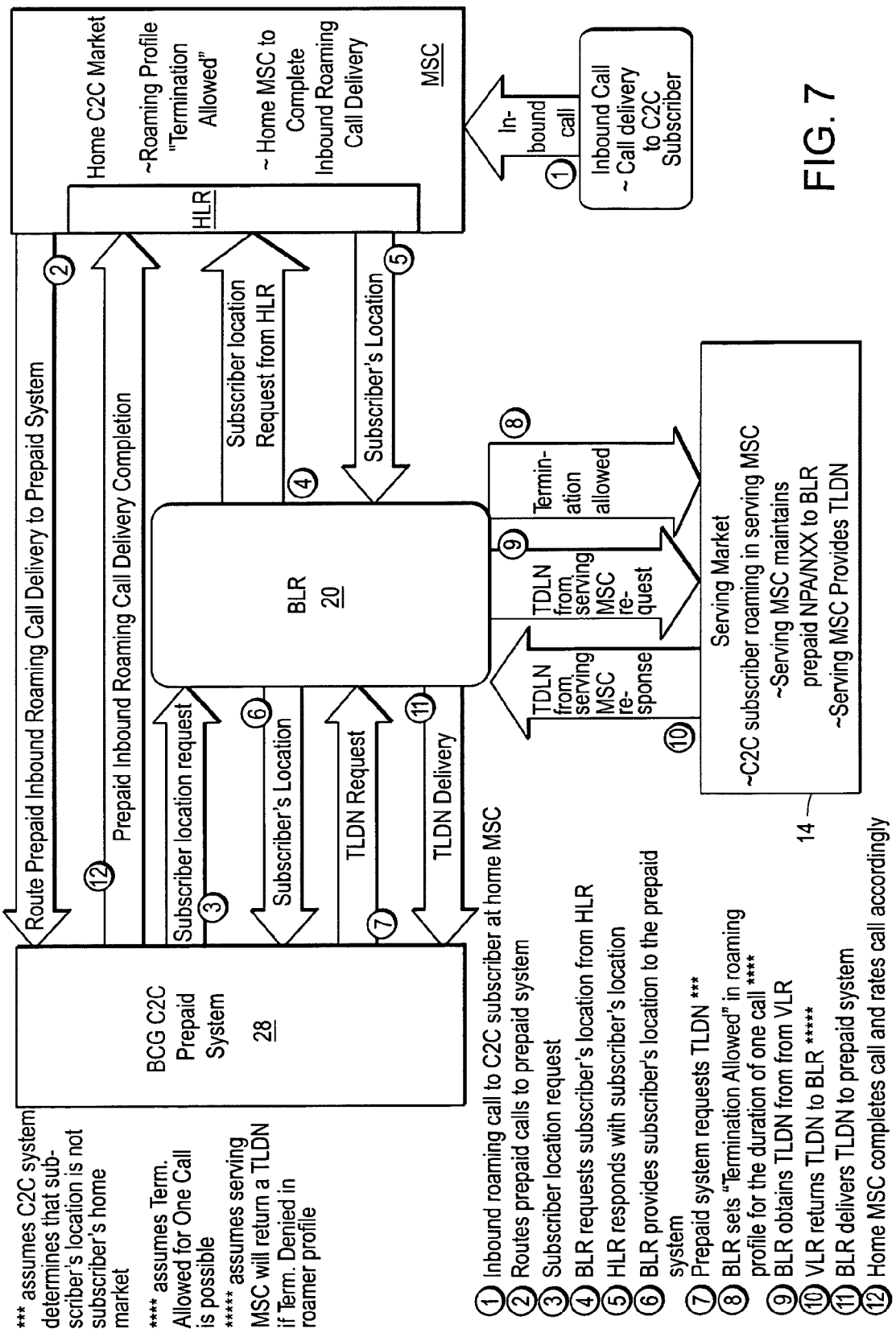
FIG. 7 depicts a data flow diagram for a delivery model for a roaming prepaid subscriber.

FIGS. 6 and 7 depict call delivery also known as call termination methods, for use with a roaming prepaid subscriber. Specifically, FIG. 6 depicts a data flow diagram that shows how the systems of the invention allow a roaming prepaid subscriber to receive an inbound call when that roaming prepaid subscriber is in their home network. Specifically, FIG. 6 depicts that an inbound call, such as a call form a land line within the serving market, can be forwarded to the gateway the home market. In this example, the prepaid subscriber is in the home coverage area and has registered with that coverage area. the gateway forwards the call to the prepaid platform such as a prepaid platform 28 depicted in FIG. 1. The prepaid platform makes a subscriber location request from the location register 20. The location register 20 requests the subscribers location from the home location register 24, that can be part of the home gateway system. The HLR 24 responds to the LR 20 with the subscribers location and the LR 20 provides that information to the prepaid system 28. The prepaid system can than complete the call to the roaming subscriber within the home coverage area. The prepaid system 28 can than perform call processing as described above wherein funds in the account associated with the subscriber are used to determine a time interval for the call.

Turning to FIG. 7 a call delivery method for a roaming subscriber, that is a prepaid subscriber that is outside of the home market is depicted. Specifically, FIG. 7 depicts that an inbound call, such as a call from a landline, can be delivered to the home market for the prepaid subscriber. In his case, the home market will route the prepaid call to the prepaid system. Here the prepaid system will make a subscriber location request to the location register 20. The HLR 24 will respond with the subscribers location. The location register 20 will then provide the location of the subscriber to the prepaid system 28. Here the prepaid system 28 may request a TLDN for performing call deliver. The LR 20 can set a parameter within the user profile such as a field termination allowed of the roaming profile, for the duration of one call. The LR 20 obtains the TLDN from the VLR and the VLR returns the TLDN to the LR 20. The LR 20 delivers the TLDN to the prepaid system and the home MSC completes the call and rates the call accordingly. In this way, a roaming prepaid subscriber can receive incoming calls in a serving market.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

We claim:

1. A system for allowing a subscriber to a prepaid communication service to roam between different service markets, the system comprising:
    a serving mobile switching center of a respective serving market capable of communicating with a roaming subscriber's phone unit and capable of generating a request for a profile associated with the subscriber,
    a location register in communication with the serving mobile switching center and in communication with a home location register associated with the subscriber profile, the location register being capable of: collecting the requested subscriber profile, determining whether a prepaid platform is associated with the respective market of the serving mobile switching center, and selectively modifying the requested and collected subscriber profile based on whether a prepaid platform is associated with the respective market of the serving mobile switching center, and
    a prepaid platform capable of performing call processing for a call associated with the subscriber,
    where the selective modification of the requested and collected subscriber profile by the location register is for enabling the serving mobile switching center to employ the prepaid platform associated with the respective market and thereby to enable the provision of prepaid services to the roaming subscriber.

2. A system according to claim 1, wherein the location register includes a database having information representative of a plurality of markets, capable of serving the subscriber, having a prepaid platform associated therewith.

3. A system according to claim 1, wherein the location register includes a message processing unit for processing a message from the serving mobile switching center for identifying whether a prepaid platform is associated with the respective market of the serving mobile switching center.

4. A system according to claim 1, wherein the serving mobile switching center includes a profile request service capable of requesting a subscriber profile in response to receipt of an NPA/NXX signal representative of the subscriber being a prepaid customer.

5. A system according to claim 1, wherein the location register includes a memory space for storing information representative of a location associated with the subscriber.

6. A system according to claim 1, wherein the location register includes means for providing a home location register with information representative of a location associated with the subscriber.

7. A system according to claim 1, wherein the location register includes means for passing through registration requests for subscribers identified as non-prepaid subscribers.

8. A system according to claim 1, wherein the location register includes means for requesting subscriber location information from a home location register associated with the subscriber.

9. A system according to claim 1, wherein the location register is in communication with the prepaid platform for delivering subscriber location information to the prepaid platform.

10. A system according to claim 1, wherein the location register includes means for communicating with a visitor location register to allow call termination for a call.

11. A system according to claim 1, wherein the location register includes an error reporter for reporting detected error conditions to the prepaid platform.

12. A system for processing calls from a subscriber, the system comprising:
- a mobile switching center capable of communicating with a subscriber phone unit and requesting a subscriber profile,
- a location register capable of: accessing the requested subscriber profile, determining whether a prepaid platform is associated with the respective market of the mobile switching center, selectively modifying the requested and accessed subscriber profile based on whether a prepaid platform is associated with the respective market of the mobile switching center requesting the subscriber profile, and providing the modified subscriber profile to the requesting mobile switching center, and
- a prepaid platform capable of: communicating with the requesting mobile switching center and performing call processing for a subscriber call,
- where the selective modification of the requested and accessed subscriber profile by the location register is for enabling the mobile switching center to employ the prepaid platform associated with the respective market and thereby to enable the provision of prepaid services to the subscriber.

13. A system according to claim 12, wherein the location register includes a database having information representative of a plurality of markets, capable of serving the subscriber, having a prepaid platform associated therewith.

14. A system according to claim 12, wherein the location register includes a message processing unit for processing a message from the mobile switching center for identifying whether a prepaid platform is associated with the respective market of the mobile switching center.

15. A system according to claim 12, wherein the mobile switching center includes a profile request service capable of requesting a subscriber profile in response to receipt of an NPA/NXX signal representative of the subscriber being a prepaid customer.

16. A system according to claim 12, wherein the location register includes a memory space for storing information representative of a location associated with the subscriber.

17. A system according to claim 12, wherein the location register is capable of providing a home location register with information representative of a location associated with the subscriber.

18. A system according to claim 12, wherein the location register is capable of passing through requests for subscribers identified as non-prepaid subscribers.

19. A system according to claim 12, wherein the location register is capable of requesting subscriber location information from a home location register associated with a subscriber.

20. A system according to claim 12, wherein the location register is capable of communicating with a visitor location register to allow call termination for a call.

21. A method for processing calls from a subscriber, the method comprising:
- determining whether a respective market for a serving mobile switching center has a prepaid platform associated therewith, wherein the serving mobile switching center receives a call associated with the subscriber; and,
- based on whether a prepaid platform is associated with the respective market, selectively modifying a profile associated with the subscriber to route the call to at least one of a prepaid platform located in the respective market for the serving mobile switching center and a prepaid platform located in a market different than the respective market for the serving mobile switching center,
- where the selective modification of the subscriber profile is for enabling the serving mobile switching center to employ the prepaid platform if the prepaid platform is associated with the respective market and thereby to enable the provision of prepaid services to the subscriber.

22. The method of claim 21, wherein the call originates from at least one of a mobile telephone and a landline.

23. The method of claim 21, wherein modifying the profile associated with the subscriber comprises:
- modifying the profile associated with the subscriber to route the call to a prepaid platform located in the respective market for the serving mobile switching center for the serving mobile switching center to complete the call.

24. The method of claim 21, wherein modifying the profile associated with the subscriber comprises:
- modifying the profile associated with the subscriber to route the call to a hotline number.

25. The method of claim 21, wherein modifying the profile associated with the subscriber comprises:
- modifying the profile associated with the subscriber to include a hotline number for a prepaid platform located in a market different than the respective market for the serving mobile switching center.

26. The method of claim 25, wherein the hotline number comprises a toll free telephone number on a public switched telephone network.

27. A method for processing calls for a subscriber, the method comprising:
- receiving a request for a profile associated with the subscriber making a call in a roaming market;
- determining whether a prepaid platform is associated with the respective roaming market; and,
- based on whether a prepaid platform is associated with the respective roaming market, modifying the profile associated with the subscriber whereby the call is selectively routed to a prepaid platform located in the respective roaming market or to a prepaid platform located in a market different than the respective roaming market.

28. The method of claim 27, wherein modifying the profile associated with the subscriber comprises:
- modifying the profile associated with the subscriber to route the call to a prepaid platform located in the respective roaming market for a mobile switching center in the respective roaming market to complete the call.

29. The method of claim 27, wherein modifying the profile associated with the subscriber comprises:
- modifying the profile associated with the subscriber to route the call to a hotline number.

30. The method of claim 27, wherein modifying the profile associated with the subscriber comprises:
- modifying the profile associated with the subscriber to include a hotline number for a prepaid platform located in a market different than the respective roaming market.

31. A method for processing calls from a subscriber, the method comprising:
- receiving, at a serving mobile switching center, a call associated with the subscriber;

requesting, from a home mobile switching center, a profile associated with the subscriber;

determining whether a prepaid platform is associated with a respective market for the serving mobile switching center; and, based on whether a prepaid platform is associated with the respective market, modifying the profile associated with the subscriber to route the call to at least one of a prepaid platform located in the respective market for the serving mobile switching center and a prepaid platform located in a market different than the respective market for the serving mobile switching center.

32. The method of claim 31, wherein modifying the profile associated with the subscriber comprises:

modifying the profile associated with the subscriber to route the call to a prepaid platform located in the respective market for the serving mobile switching center for the serving mobile switching center to complete the call.

33. The method of claim 31, wherein modifying the profile associated with the subscriber comprises:

modifying the profile associated with the subscriber to route the call to a hotline number.

34. The method of claim 31, wherein modifying the profile associated with the subscriber comprises:

modifying the profile associated with the subscriber to include a hotline number for a prepaid platform located in a market different than the respective market for the serving mobile switching center.

35. A processor program for processing calls from a subscriber, the processor program being tangibly stored on a processor-readable medium and comprising instructions operable to cause a processor to:

determine whether a respective market for a serving mobile switching center has a prepaid platform associated therewith, wherein the serving mobile switching center receives a call associated with the subscriber; and, based on whether a prepaid platform is associated with the respective market, modify a profile associated with the subscriber to route the call to at least one of a prepaid platform located in the respective market for the serving mobile switching center and a prepaid platform located in a market different than the respective market for the serving mobile switching center.

36. The processor program of claim 35, wherein the instructions to modify a profile associated with the subscriber to route the call comprise instructions to:

modify the profile associated with the subscriber to route the call to a prepaid platform located in the respective market for the serving mobile switching center.

37. The processor program of claim 35, wherein the instructions to modify a profile associated with the subscriber to route the call comprise instructions to:

modify the profile associated with the subscriber to route the call to a hotline number.

38. The processor program of claim 35, wherein the instructions to modify a profile associated with the subscriber to route the call comprise instructions to:

modify the profile associated with the subscriber to include a hotline number for a prepaid platform located in a market different than the respective market for the serving mobile switching center.

39. A method for routing a call, the method comprising:

determining whether a respective market for a serving mobile switching center receiving the call has a prepaid platform associated therewith; and, based on whether a prepaid platform is associated with the respective market for the serving mobile switching center receiving the call, routing the call to at least one of a hotline number and a prepaid platform associated with the respective market for the serving mobile switching center.

40. The method of claim 39, wherein the call originates from at least one of a mobile telephone and a landline.

41. The method of claim 39, wherein the hotline number comprises a toll free telephone number on a public switched telephone network.

42. The method of claim 39, wherein routing the call to at least one of a hotline number and a prepaid platform associated with the respective market for the serving mobile switching center comprises:

modifying a profile associated with a subscriber associated with the call to route the call to at least one of a hotline number and a prepaid platform associated with the respective market for the serving mobile switching center.

43. The method of claim 39, wherein routing the call to a prepaid platform associated with the respective market for the serving mobile switching center comprises:

routing the call to a prepaid platform associated with the respective market for the serving mobile switching center to allow the serving mobile switching center to complete the call.

44. The method of claim 39, wherein routing the call to a prepaid platform associated with the respective market for the serving mobile switching center comprises:

modifying a profile associated with a subscriber associated with the call to route the call to a prepaid platform associated with the respective market for the serving mobile switching center to allow the mobile switching center to complete the call.

45. The method of claim 39, wherein routing the call to a hotline number comprises:

routing the call to a hotline number to a prepaid platform associated with a market different than the respective market associated with the serving mobile switching center.

46. The method of claim 39, wherein routing the call to a hotline number comprises:

modifying a profile associated with a subscriber associated with the call to include a hotline number for a prepaid platform associated with a market different than the respective market associated with the serving mobile switching center.

47. A processor program for routing a call, the processor program being tangibly stored on a processor readable medium and comprising instructions operable to cause a processor to:

determine whether a prepaid platform is associated with a respective market for a serving mobile switching center receiving the call; and, based on whether a prepaid platform is associated with the respective market for the serving mobile switching center receiving the call, route the call to at least one of a hotline number and a prepaid platform associated with the respective market for the serving mobile switching center.

48. The processor program of claim 47, wherein the instructions to route the call to at least one of a hotline number and a prepaid platform associated with the respective market for the serving mobile switching center comprise instructions to:

modify a profile associated with a subscriber associated with the call to route the call to at least one of a hotline number and a prepaid platform associated with the respective market for the serving mobile switching center.

49. The processor program of claim 47, wherein the instructions to route the call to a prepaid platform associated with the respective market for the serving mobile switching center comprises instructions to:

route the call to a prepaid platform associated with the respective market for the serving mobile switching center to allow the serving mobile switching center to complete the call.

50. The processor program of claim 47, wherein the instructions to route the call to a prepaid platform associated with the respective market for the serving mobile switching center comprises instructions to:

modify a profile associated with a subscriber associated with the call to route the call to a prepaid platform associated with the respective market for the serving mobile switching center to allow the serving mobile switching center to complete the call.

51. The processor program of claim 47, wherein the instructions to route the call to a hotline number comprise instructions to:

route the call to a hotline number to a prepaid platform associated with a market different than the respective market associated with the serving mobile switching center.

52. The processor program of claim 47, wherein the instructions to route the call to a hotline number comprise instructions to:

modify a profile associated with a subscriber associated with the call to include a hotline number to a prepaid platform associated with a market different than the respective market associated with the serving mobile switching center.

\* \* \* \* \*

UNITED STATES PATENT AND TRADEMARK OFFICE
CERTIFICATE OF CORRECTION

PATENT NO. : 7,187,928 B1 Page 1 of 1
APPLICATION NO. : 09/449001
DATED : March 6, 2007
INVENTOR(S) : Paul Senn et al.

It is certified that error appears in the above-identified patent and that said Letters Patent is hereby corrected as shown below:

Column 2, line 11, "finds" should read --funds--;

Column 2, line 35, "finds" should read --funds--;

Column 5, line 31, "saving" should read --serving--;

Column 8, line 21, "MN" should read --MIN--; and

Column 9, line 46, "his" should read --this--.

Signed and Sealed this

Twenty-fourth Day of February, 2009

JOHN DOLL
*Acting Director of the United States Patent and Trademark Office*